March 16, 1954     F. LYIJYNEN     2,672,176
DIE APPARATUS FOR MAKING LAMINATED PANELS
Original Filed April 3, 1946     3 Sheets-Sheet 1
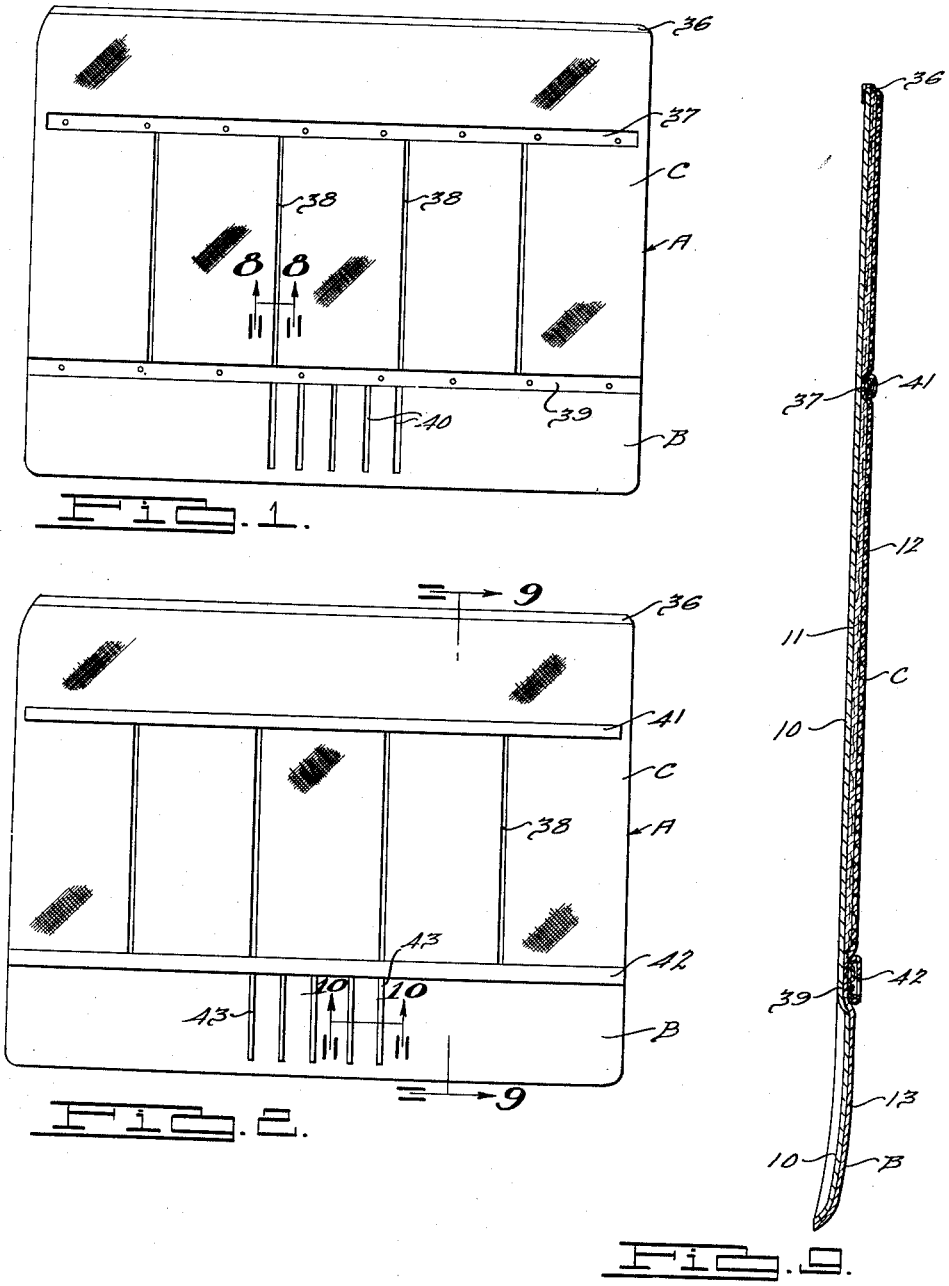
INVENTOR.
Fred Lyijynen.
BY
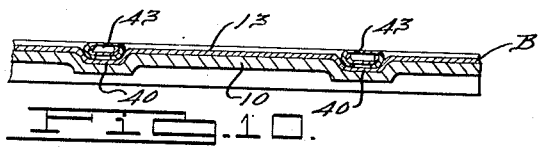
ATTORNEY.

March 16, 1954
F. LYIJYNEN
2,672,176
DIE APPARATUS FOR MAKING LAMINATED PANELS
Original Filed April 3, 1946
3 Sheets-Sheet 2
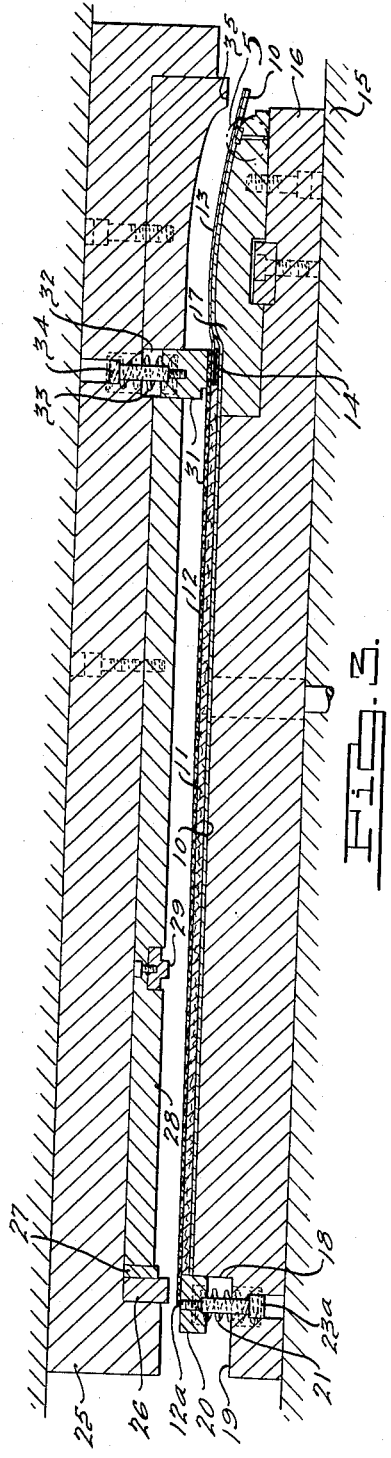
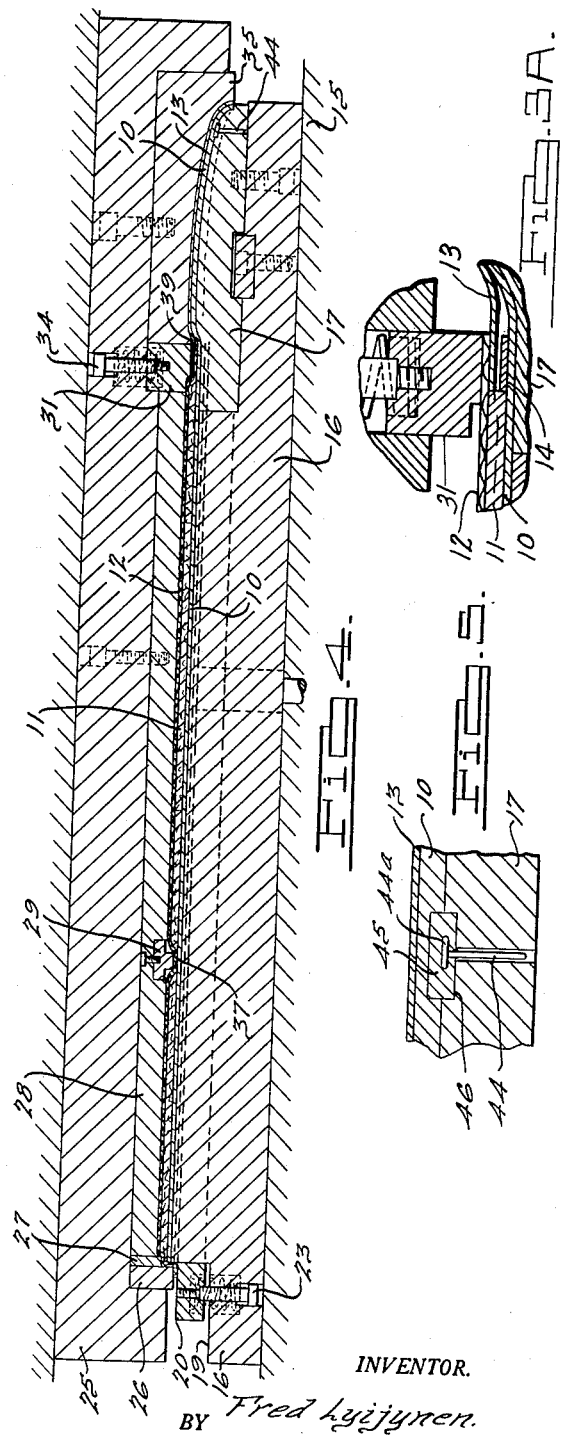
INVENTOR.
BY Fred Lyijynen.
Elmer Jamison Gray
ATTORNEY.

March 16, 1954 F. LYIJYNEN 2,672,176
DIE APPARATUS FOR MAKING LAMINATED PANELS
Original Filed April 3, 1946 3 Sheets-Sheet 3
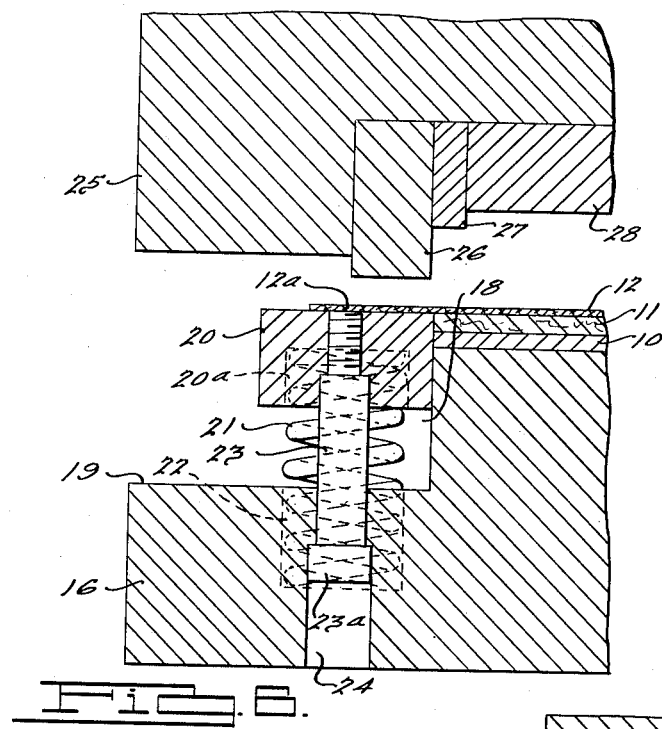
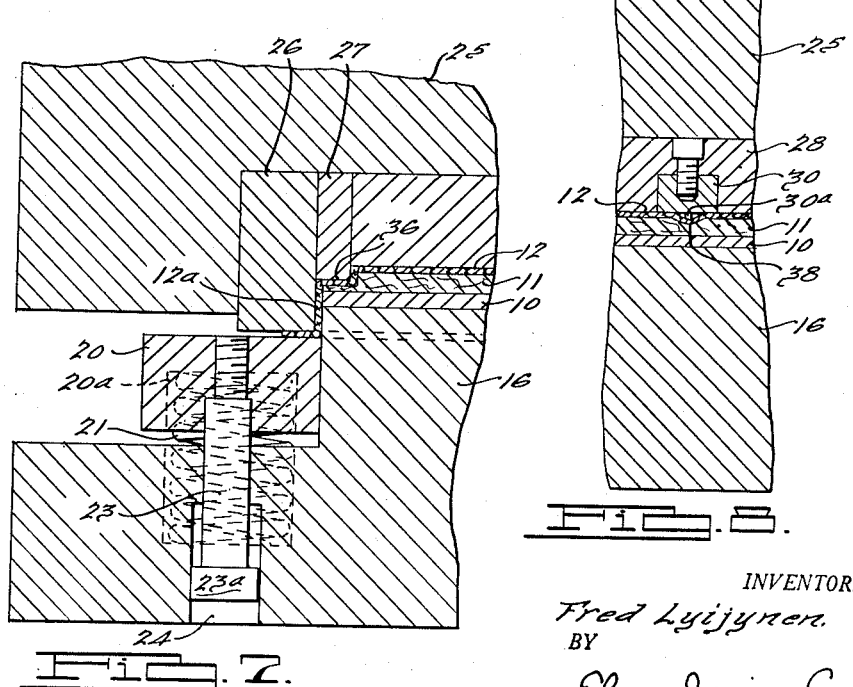
INVENTOR.
Fred Lyijynen.
BY
Elmer Jamison Gray
ATTORNEY.

Patented Mar. 16, 1954

2,672,176

UNITED STATES PATENT OFFICE 2,672,176

DIE APPARATUS FOR MAKING LAMINATED PANELS

Fred Lyijynen, Detroit, Mich., assignor to Briggs Manufacturing Company, Detroit, Mich., a corporation of Michigan Original application April 3, 1946, Serial No. 659,405. Divided and this application May 17, 1949, Serial No. 93,660

6 Claims. (Cl. 154—1)

1

This invention relates to ornamental panels and to the manufacture thereof, such panels being particularly, although not exclusively, adapted for use as inner trim panels of various types of vehicle bodies, especially automobile bodies. One such panel, suitable for use in trimming the inside of an automobile door, may comprise two contrasting sections, i. e. an upper upholstered section and a lower kick-pad or kick-panel section which, although of ornamental or decorative character, is unupholstered.

This is a division of my co-pending application Ser. No. 659,405, filed April 3, 1946, now U. S. Patent 2,573,466.

An object of the invention is to provide an improved apparatus for making an ornamental panel of the type having a fabric covered foundation and in which the fabric or trim covering material is bonded to the foundation through the medium of a thermoplastic or thermosetting resinous substance.

A further object of the invention is to improve the manufacture of ornamental trim panels of the type having a foundation, a top layer or covering of fabric and an interposed layer of padding, an important feature of the invention residing in the provision of improved means for stretching the fabric over the padding and foundation layers and the bonding of the layers while the fabric is in stretched condition.

Another object of the invention is to produce an improved apparatus for fabricating a trim panel or the like having an upholstered section and an adjoining kick-panel section, provision being made for consolidating together and to the foundation adjacent edge portions of the cover sheets of the upholstered and kick-panel sections and thereafter stretching the fabric cover sheet before securing the opposite edge thereof to the foundation.

Still another object of the invention is to provide means for bonding and holding one edge of the fabric cover sheet to the foundation while the opposite edge is drawn over the edge of the foundation to stretch the fabric, these latter edges being bonded together while the fabric is in stretched or taut condition.

A further object of the invention is to impress ornamental grooves or depressions in the covering material of the trim panel and to bond this material to the foundation at the locality of the grooves or depressions, said impressing operation being performed while the fabric covering of the panel is in stretched or taut condition.

Another object of the invention is to attach a

2 plurality of fastener devices to the underside of the foundation sheet during the fabrication of the trim panel, the fasteners being united to the foundation through the medium of resin impregnated materials which are consolidated under heat and pressure with the foundation.

Other objects of this invention will appear in the following description and appended claims, reference being had to the accompanying drawings forming a part of this specification wherein like reference characters designate corresponding parts in the several views.

Fig. 1 is a plan view of a trim panel constructed in accordance with the invention, the metal molding or ornamental finish strips being omitted in this view.

Fig. 2 is a view similar to Fig. 1 but illustrating the metal moldings installed on the trim panel.

Fig. 3 is a sectional elevation of a die or mold apparatus taken longitudinally through substantially the middle of the trim panel to be formed, the dies in this view being shown in open position.

Figure 3A is an enlarged fragmentary sectional view taken at the locality 14 in Fig. 3.

Fig. 4 is a view similar to Fig. 3 but illustrating the dies fully closed.

Fig. 5 is an enlarged detailed section of the parts enclosed within the circle 5 in Fig. 3.

Fig. 6 is an enlarged fragmentary section of the fabric stretching mechanism with the dies in opened position.

Fig. 7 is a view similar to Fig. 6 but illustrating the dies in closed position.

Fig. 8 is an enlarged fragmentary section taken through the dies substantially along the lines 8—8 of Fig. 1 looking in the direction of the arrows.

Fig. 9 is an enlarged section taken through the dies substantially along lines 9—9 of Fig. 2 looking in the direction of the arrows.

Fig. 10 is an enlarged fragmentary section taken through the dies substantially along lines 10—10 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In Fig. 1 there is illustrated, by way of exemplification of one embodiment of the invention, an ornamental panel A adapted to be mounted on the inside of an automobile door immediately below the window opening thereof for the purpose of covering the inner metal door panel and providing an ornamental finish for the inside of the door. The trim panel A is provided along the bottom thereof with an unupholstered so-called kick-pad or kick-panel section B which, in the present instance, is composed of consolidated laminations of sheet materials. The remainder of the trim panel above and laterally adjoining the kick-pad section B comprises an upholstered or fabric covered padded section C which, in the present instance, occupies the principal area of the panel and is formed on the fabric side thereof with ornamental grooves or depressions which may follow any desired design or pattern and in the localities of which the various laminations of the upholstered section of the panel are permanently bonded together. It will be understood that the design or pattern applied to the trim panel A and the configuration thereof are shown in Fig. 1 solely for the purposes of illustration since they may vary widely in accordance with the requirements as to ornamentation and design.

The trim panel comprises a relatively heavy foundation board 10 covered in one area thereof with a layer of padding or wadding 11 which in turn is covered with a top sheet 12 of fabric or other equivalent trim material. The padding 11 and fabric 12 form the upholstered section C of the trim panel. The adjoining area of the trim panel at the lower portion thereof, which is to be formed into the kick-panel section B, is provided with a covering layer 13 which is preferably in the form of cellulosic material. The covering material 13 of the kick-panel section B is provided along its upper edge with an extended portion overlapped at 14 by an extended portion of the fabric 12, and as hereinafter described these overlapping portions of the sheets 12 and 13 are embossed or compressed by die operation and at the same time bonded or consolidated together. The fabric 12 along its upper edge has an extended portion 12a which, as shown in Fig. 3, extends beyond the upper edges of the foundation board 10 and padding layer 11.

The foundation board 10 may be of any suitable composition, but is preferably formed of compressed fibrous stock so as to have the requisite strength, rigidity and stiffness. The foundation may be composed of one or a plurality of layers of paper or fibrous stock impregnated with a thermosetting resinous substance which are consolidated together under heat and pressure. The foundation may be treated or impregnated with a resinous substance and preformed to the shape illustrated, for example, in Fig. 3 with the resinous substance remaining after the preforming operation in an intermediate stage of reaction or polymerization. It will be understood that the foundation board 10 may be fabricated or prepared in various ways, such for example, as in the manner disclosed in co-pending application Serial No. 614,978 filed September 7, 1945, now abandoned.

In the preforming operation between heated dies the kick-panel section B is preferably partially formed or shaped so as to approximate the final shape of the kick-panel B in the completed article. Preferably the foundation material is impregnated with a resin, such as a phenol-formaldehyde or melamine resin converted into varnish by the use of suitable solvents. This resinous material is preferably only partially cured or reacted during the preforming operation, thereby facilitating the consolidation of the padding and covering layers during the final operations illustrated in Figs. 3 and 4. It will be understood that the covering material 13 for the kick-panel section may comprise one or a plurality of sheets, preferably thin alpha-cellulose sheets in the form of white wood pulp paper or other fine grain cellulosic material. The covering material 13 is preferably given an ornamental finish such, for example, as a wood grain finish which may be applied thereto in any conventional manner.

After the preforming operation with respect to the foundation board 10, the latter is introduced into a press between upper and lower die members. The fabric material 11 and the covering material 13 are then superimposed upon the foundation in proper relation upon the foundation in the manner illustrated in Fig. 3 preparatory to the final operation of finally forming the panel to shape and consolidating together the various layers or laminations by the use of heat and pressure.

In the present instance the apparatus for completing the formation of the panel comprises a bed 15 upon which is secured a bottom die or platen 16. One edge of this platen at the upper face thereof adjacent the kick-panel is cut away to receive a die insert 17 rigidly secured to the platen 16. The upper surface of the die insert 17 is shaped or contoured in accordance with the final shape of the kick-panel and adjoining portion of the foundation board 10. The opposite edge of the platen 16 at the upper face thereof is cut away transversely to provide a recess having a vertical wall 18 and a horizontal wall 19. Positioned within this recess in sliding contact with the wall 18 is a draw or pressure pad 20 having a length corresponding to the width of the upper edge of the trim panel. This pad is recessed at 20a to receive the upper end of a compression spring 21, the lower end of this spring being seated within a recess 22 in the platen 16. Extended centrally through the coils of the spring 21 is a guide plunger 23 terminating at its lower end in a cylindrical head 23a having a sliding fit within the cylindrical hole 24 in the platen. The plunger 23 has a threaded upper end screwed into a tapped hole in the pad 20.

The die or mold apparatus also includes an upper platen or punch member 25 recessed at one end to receive a stretching die insert 26 having a length corresponding to the length of the pad 20. This die insert projects somewhat below the adjacent lower face of the platen 25. Also anchored in fixed position within the recess in the platen 25 and lying adjacent the stretching die 26 is a creasing or embossing die insert 27, the lower edge of which terminates a predetermined distance above the lower edge of the die 26. Also fixed within the recess in the lower face of the platen 25 is a die plate or die insert 28 shaped or contoured to conform to the final shape of the upper surface of the trim panel. Fixed within a transverse groove or recess in the die insert 28 is a transverse grooving die insert 29. Also fixed within grooves or recesses in the die 28 are a number of longitudinal grooving die inserts 30, each being formed integrally with a narrow creasing or embossing projection 30a, see Fig. 8. A transverse die or pressure pad 31 is slidingly fitted within a transverse opening 32 in the die 28, see Fig. 3. This die pad 31 is backed by a compression spring 33 extending into a recess in the platen 25, this die pad being guided by a headed plunger 34 slidable within a hole within the platen. The working surface of the die 28 opposite the kick-panel section B of the trim panel is curved or contoured to give the final shape thereto and terminates in a projecting portion 35 (Figs. 3 and 5) cooperable with the die insert 17 to form an in-turned edge along the lower edge of the panel.

When the upper and lower die members assume their relative positions shown in Fig. 3, upon descent of the upper ram of the press, the pressure pad 31 first engages the panel at the locality 14 of overlap of the fabric 12 and top layer 13 of the kick-panel. As the ram continues to descend from the position shown in Fig. 3 toward the position shown in Fig. 4 the stretching die 26 engages the fabric extension 12a and clamps this extension against the upper face of the pressure pad 20. Continued descent of the ram results in drawing downward the fabric extension 12a over the edges of the foundation 10 and wadding 11. Since the fabric during this operation is clamped along the opposite edge thereof by the pressure pad 31, the fabric will be stretched longitudinally in the direction of the upper edge of the trim panel, thus rendering the fabric taut across the face of the panel from locality 14 along the upper edge of the kick-panel to the upper edge of the trim panel. The coaction of the stretching die 26 with the pressure pad 20 will force the latter downwardly toward the position of Fig. 7, and after sufficient stretching action has taken place on the fabric 12 the creasing or embossing die 27 will engage the fabric 12 and wadding 11, compressing the same and forming a depressed groove 36 along the upper edge of the trim panel. Since the upper platen 25 and associated die inserts as well as the lower platen 16 are heated to the proper temperature, the action of the die insert 27 in compressing the materials to form the groove 36 will result in consolidating the fabric 12, wadding 11 and foundation 10 along this groove and creating a permanent bond of these layers by completing the curing or polymerization of the resin with which the foundation and wadding is impregnated or treated.

After the stretching of the fabric has been completed the die insert 29 will engage the panel and compress the wadding and fabric to form a transverse groove or channel 37 therein. At the same time the ribs 30a of the die inserts 30 will form narrow vertical channels or grooves 38 in the fabric and wadding, and the pressure pad 31 will press together the kick-panel top sheet 13, fabric and wadding to form a transverse channel 39. In like manner ornamental grooves 40 may be formed in the upper face of the kick-panel (see Figs. 2 and 10) by means of suitable grooving die inserts.

Before the fabric 12 is applied to the padding 11 preparatory to the die operation a suitable quantity of resinous material in the form of a lacquer is preferably applied, as by spraying or brushing, to the upper surface of the wadding in the areas 36, 37, 38 and 39. Hence, when the die members 27, 29, 30 and 31 engage the materials under pressure as shown in Fig. 4, the heat from these die members as well as from the die members 16 and 17 will consolidate together the various layers of the trim panel effecting a permanent bond therebetween and completing the polymerization of the resin.

After the trim panel has been removed from the die apparatus the free edge of the fabric along the upper edge of the panel may be turned under and cemented in any suitable manner to the underside of the foundation 10, as shown in Fig. 9. An ornamental molding 41 may be inserted into the groove or channel 37 and secured in position by suitable prong fasteners extending through holes in the bottom of the channel and clinched over the bottom of the foundation board. In like manner an ornamental metal molding strip 42 may be lodged within the groove or channel 39 and secured in position in the same manner as the molding 41. Similarly narrow ornamental moldings 43 may be anchored within the grooves or channels 40 in the kick-panel section.

In the present embodiment I have provided means for attaching fastener devices 44 to the underside of the kick-panel section B near the lower edge thereof, these fasteners being intended for the purpose of attaching the lower edge of the trim panel to the inner metal panel or frame of the door. As shown in Fig. 5, each fastener 44, which is of the converging prong type, has an upper terminal head 44a confined within a pad or piece of paper or fibrous material 45 which has been impregnated with a partially polymerized resin. The pads 45, before assembling the trim panel layers on the platen 16, are lodged within recesses 46 in the die insert 17, as shown in Fig. 5. A suitable number of fasteners 44 mounted within pads 45 are provided and spaced apart transversely at the desired locations. When the dies are closed the heat and pressure of the cooperating dies will force the pads 45 into the foundation sheet 10 and consolidate them together to create a permanent bond resulting from the final polymerization of the resin. Thus, it will be seen that this operation will result in permanently installing the fasteners 44 along the lower edge of the trim panel.

I claim:

1. In a press for making a laminated panel composed of foundation and cover layers, upper and lower relatively movable dies adapted to receive said layers therebetween, relatively movable clamping members carried by said dies, an upper gripping member carried by the upper die at a locality spaced from said clamping members, a lower gripping member carried by the lower die and underlying the upper gripping member to cooperate therewith in gripping the cover layer during a pressing operation, the lower gripping member being yieldable under the pressure of the upper gripping member during the pressing operation, a die member carried by one of said dies intermediate said clamping and gripping members and adjacent the latter members and cooperable with a portion of the other die to compress said layers at one side of said gripping members, said gripping members when the press is open being spaced apart a less distance than the distance between said die member and die portion thereby to grip a cover layer during closing of the press prior to cooperation of said die member and die portion to compress said layers, and said clamping members when the press is open being spaced apart a less distance than said gripping members thereby to clamp said layers during closing of the press prior to operation of the gripping members to grip said cover layer.

2. In a press for making a laminated panel composed of foundation and cover layers, a pair of relatively movable dies adapted to receive said layers therebetween, relatively movable clamping members carried by said dies, a gripping member carried by the die confronting the cover layer and projecting from the surface of that die toward the other die, a yieldable gripping member carried by said other die and disposed to underlie the cover layer in opposition to the first gripping member and being yieldable under the pressure of the latter during a pressing operation, said gripping members being disposed at a locality spaced from said clamping members, a die member carried by one of said dies adjacent said gripping members and cooperable with a portion of the other die to compress said layers at one side of said gripping members, said gripping members when the press is open being spaced apart a less distance than the distance between said die member and die portion thereby to grip a cover layer during closing of the press prior to cooperation of said die member and die portion to compress said layers, said clamping members when the press is open being spaced apart a less distance than said gripping members thereby to clamp said layers during closing of the press prior to operation of the gripping members to grip said cover layer, and an embossing die portion carried by one of said dies and spaced from the other die when the press is open a distance greater than the spacing of said gripping members.

3. In a press for making a laminated panel composed of foundation and cover layers, a pair of relatively movable dies adapted to receive said layers therebetween with one die confronting the cover layer and the other die confronting the foundation layer, relatively movable clamping members carried by said dies, a gripping member carried by said one die and projecting therefrom toward the other die, a yieldable gripping member carried by said other die in opposition to said first gripping member and being yieldable under the pressure thereof during a pressing operation, means yieldingly resisting movement of the yieldable gripping member during said pressing operation, said gripping members being disposed at a locality spaced from said clamping members, a die member carried by one of said dies intermediate said clamping and gripping members and cooperable with a portion of the other die to compress said layers, said gripping members when the press is open being spaced apart a less distance than the distance between said die member and die portion thereby to grip a cover layer during closing of the press prior to cooperation of said die member and die portion to compress said layers, and said clamping members when the press is open being spaced apart a less distance than said gripping members thereby to clamp said layers during closing of the press prior to operation of the gripping members to grip said cover layer.

4. In a press for making a laminated panel composed of foundation and cover layers, a pair of relatively movable dies adapted to receive said layers therebetween, opposed clamping members carried by said dies, one of said clamping members being yieldable under the pressure of the other during a pressing operation, means for resisting the yielding of said one clamping member, a gripping member carried by one die and projecting therefrom toward the other die, a yieldable gripping member carried by said other die in opposition to said first gripping member and being yieldable under the pressure thereof during a pressing operation, means for resisting the yielding of the yieldable gripping member, said gripping members being disposed at a locality spaced from said clamping members, a die member carried by one of said dies intermediate said gripping and clamping members and cooperable with a portion of the other die to compress said layers, said gripping members when the press is open being spaced apart a less distance than the distance between said die member and die portion thereby to grip a cover layer during closing of the press prior to cooperation of said die member and die portion to compress said layers, and said clamping members when the press is open being spaced apart a less distance than said gripping members thereby to clamp said layers during closing of the press prior to operation of the gripping members to grip said cover layer.

5. In a press for making a laminated panel composed of foundation and cover layers, a pair of relatively movable platens adapted to receive said layers therebetween, forming dies carried by said platens, relatively movable clamping portions carried by the platens for clamping said layers together at one locality thereof, relatively movable stretching die members carried by the platens and spaced from said clamping members, said stretching die members being adjacent and outward of an edge of said dies intermediate said clamping portions and stretching die members, thereby to grip an edge of a cover layer extending beyond said dies, the stretching die member carried by one of said platens projecting from the surface thereof toward the stretching die member carried by the other platen, the latter stretching die member being yieldable under the pressure of the former stretching die member during a pressing operation, means resisting yielding of said latter stretching die member, a die portion carried by one of said dies alongside one of said stretching die members and cooperable with a portion of the other die to compress said layers, said stretching die members when the press is open being spaced apart a less distance than the distance between said die portions, thereby to grip said edge of the cover layer during closing of the press prior to cooperation of said die portions, and said clamping portions when the press is open being spaced apart a less distance than said stretching die members thereby to clamp said layers during closing of the press prior to cooperation of said stretching die members.

6. In a press for making a laminated panel composed of foundation and cover layers, a pair of relatively movable platens adapted to receive said layers therebetween, forming dies carried by said platens, relatively movable clamping portions carried by the platens for clamping said layers together at one locality thereof, relatively movable stretching die members carried by the platens and spaced from said clamping members, said stretching die members being adjacent and outward of an edge of said dies intermediate said clamping portions and stretching die members, thereby to grip an edge of a cover layer extending beyond said dies, the stretching die member carried by one of said platens projecting from the surface thereof toward the stretching die member carried by the other platen, the latter stretching die member being yieldable under the pressure of the former stretching die member during a pressing operation, means resisting yielding of said latter stretching die member, said stretching die members when the press is open being spaced apart a less distance than the distance between said dies, thereby to grip said edge of the cover layer during closing of the press prior to cooperation of said dies, and said clamping portions when the press is open being spaced apart a less distance than said stretching die members thereby to clamp said layers during closing of the press prior to cooperation of said stretching die members.

FRED LYIJYNEN.

References Cited in the file of this patent

UNITED STATES PATENTS

| Number | Name | Date |
| --- | --- | --- |
| 892,702 | Wyman | July 7, 1908 |
| 910,257 | Wright | Jan. 19, 1909 |
| 1,241,517 | Jacoby | Oct. 2, 1917 |
| 1,669,266 | Stevens | May 8, 1928 |
| 1,755,926 | Leguillon et al. | Apr. 22, 1930 |
| 1,828,347 | Straus | Oct. 20, 1931 |
| 1,838,102 | McGovern | Dec. 29, 1931 |
| 2,140,711 | Mitchell | Dec. 20, 1938 |
| 2,143,136 | Ball | Jan. 10, 1939 |
| 2,169,798 | Haberstump | Aug. 15, 1939 |
| 2,245,170 | Von Ende et al. | June 10, 1941 |
| 2,378,642 | Kopplin | June 19, 1945 |

FOREIGN PATENTS

| Number | Country | Date |
| --- | --- | --- |
| 344,130 | Italy | Oct. 24, 1936 |